F. SCHNEIBLE.
TIRE.
APPLICATION FILED SEPT. 27, 1918.
1,312,582.
Patented Aug. 12, 1919.
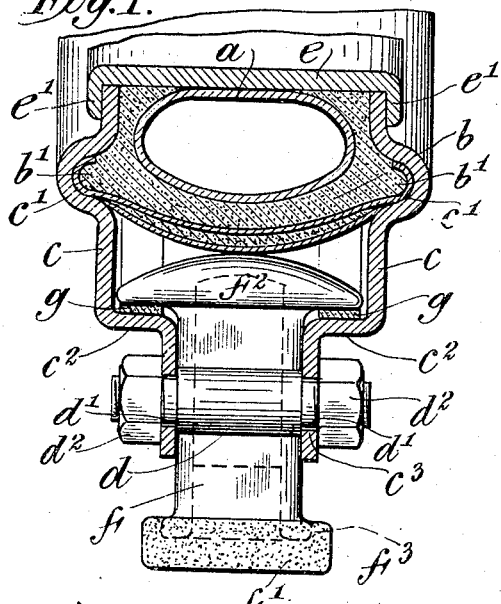
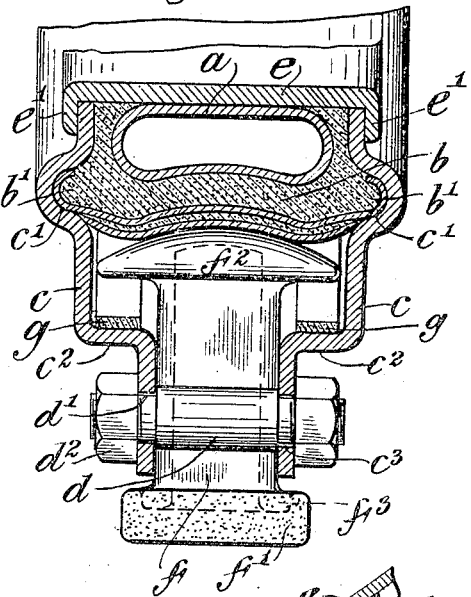
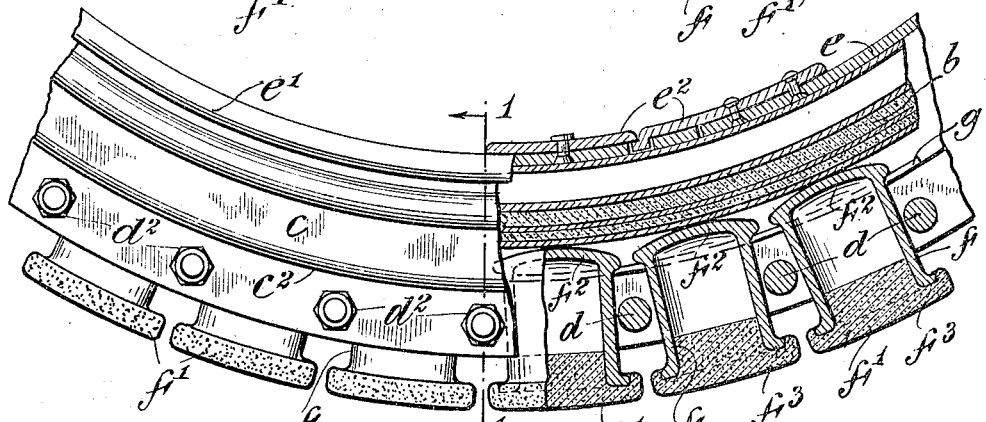
WITNESS
INVENTOR
Frank Schneible
BY
Redding, Greeley & Goodlett
ATTORNEYS ically, Patent Filed September 27, 1918. Serial No. 255,892

UNITED STATES PATENT OFFICE.

FRANK SCHNEIBLE, OF NEW YORK, N. Y.

TIRE.

1,312,582.                    Specification of Letters Patent.        Patented Aug. 12, 1919.

Application filed September 27, 1918. Serial No. 255,892.

*To all whom it may concern:*

Be it known that I, FRANK SCHNEIBLE, a citizen of the United States, residing in the borough of Manhattan of the city of New York, in the State of New York, have invented certain new and useful Improvements in Tires, of which the following is a specification, reference being had to the accompanying drawing, forming a part hereof.

The object of this invention is to provide an armored pneumatic tire which, besides being nonpuncturable, shall retain its resilience under all conditions of load, shall be lighter in weight than armored tires of the same size heretofore produced and not greatly exceeding in weight nonarmored tires adapted for like conditions of use, shall be inexpensive and in fact not more expensive than a non-armored tire of a size suitable for similar conditions of use, and shall be easily capable of repair. In accordance with the invention, the pneumatic tire or shoe, slightly modified in form as compared with the ordinary tire, but smaller in size and lighter in weight, is received between two annular plates which are held in relative position by spacing bolts and by an annular flanged rim, while tread blocks bearing against the pneumatic shoe move radially between the two annular plates. The invention will be more fully explained hereinafter with reference to the accompanying drawing in which it is illustrated, and in which—

Figure 1 is a view of the improved tire in cross section, with the parts in the position which they assume when the pneumatic tube is inflated and there is no load on the tire.

Fig. 2 is a similar view showing the parts in the position which they assume when the tube is compressed.

Fig. 3 is a view partly in side elevation and partly in longitudinal section of a portion of the improved tire, on a smaller scale than that of Figs. 1 and 2.

The complete, armored tire comprises a pneumatic tube $a$ of usual construction, a fabricated shoe $b$ of rubber and fabric, constructed substantially as usual but preferably formed with ribs $b'$ or otherwise to coöperate with the armor as hereinafter explained, two annular side plates $c$, which are interchangeable, are formed preferably with interior channels $c'$ to coöperate with the fabricated shoe and have inward offsets, as at $c^2$, spacing bolts $d$, a flanged holding rim $e$ having narrow side flanges $e'$, and tread blocks $f$ of metal, preferably hollow and adapted to receive each a fabricated rubber tread $f'$. Noise deadening packing rings $g$ may also be provided to prevent the clicking noise which might otherwise be heard when the armored tire is in use. Each spacing bolt $d$ is shouldered, as at $d'$, at each end, to furnish an abutment for the annular plate $c$, and is threaded at each end to receive a nut $d^2$, the threaded portion being extended through a suitable aperture $c^3$ formed in the annular side plate. Each tread block $f$ has an inner head $f^2$ to bear against the fabricated shoe $b$, being convex both longitudinally and transversely so that under a minimum load the area of contact between the tread block and the shoe will also be a minimum, while as the load increases the area of contact increases, whereby for a given degree of inflation of the tube the resilience of the tire will be substantially constant for all conditions of load. Each head $f^2$ is extended laterally so that in the extreme outer position of the tread block the head will bear against the shoulders $c^2$ of the side plates $c$ and the outer movement of the tread block will be limited thereby. The sound deadening rings $g$ of fiber, or fabric, or any suitable material, are interposed between the head $f^2$ and the shoulder $c^2$, at each side, for the purpose of preventing contact of metal with metal in the operation of the tire. Should it happen that the tube $a$ is deflated while the tire is in use it is nevertheless possible to continue the use of the vehicle because under such condition, when the tread block is forced inward toward the center of the wheel, the head $f^2$ thereof will be supported by the body of the fabricated shoe, at each side, somewhat as indicated in Fig. 2, by reason of the engagement of the shoe with the side plates. The outer end of the hollow tread block $f$ is adapted to receive the cushion tread $f'$, being formed with a flange or bead $f^3$ not only to limit inward movement of the tread block $f$ in operation but to afford a proper engagement with the cushion tread $f'$. The rim $e$ having narrow flanges $e'$ is a noncontinuous or split rim of any approved type having its abutting ends held in working position by a suitable fastening device of known construction, such as that shown at $e^2$.

In assembling the complete tire one of the annular side plates $c$ may be laid upon the floor and the spacing bolts $d$ secured thereto. The tread blocks may then be laid upon the side plate between adjacent bolts and the other side plate placed in position and secured by the application of the nuts at the other end of the bolts $d$. The fabricated shoe may be placed in position before the nuts are tightened up on the bolts $d$ and tube $a$, partly inflated if desired, may also be slipped in position. Finally the split rim $e$ is contracted and placed centrally within the tire as so far assembled and is then allowed to expand so that its flanges $e'$ shall engage the inner edges of the side plates $c$ and retain them in position. The nuts $d^2$ may then be set up and the tube $a$ fully inflated so that the complete tire will then form a unit ready for application to the wheel of a vehicle in the same manner as any demountable rim with its tire.

It will be understood that various changes in details of construction and arrangement may be made to suit different conditions of use or the convenience of the manufacturer and that, except as pointed out in the accompanying claims, the invention is not limited to the precise details of construction and arrangement shown and described herein.

I claim as my invention:

1. An armor for a pneumatic tire comprising annular side plates, radially movable tread blocks between the side plates, means to secure the side plates together and a supporting rim independent of the wheel, capable of being applied thereto and removed therefrom readily and in engagement with the side plates.

2. An armor for a pneumatic tire comprising annular side plates, radially movable tread blocks between the side plates, spacing bolts to secure the side plates together near their outer edges and a supporting rim independent of the wheel, capable of being applied thereto and removed therefrom readily and in engagement with the side plates.

3. An armor for a pneumatic tire comprising annular side plates, radially movable tread blocks between the side plates, means to secure the side plates together near their outer edges and a flanged supporting rim to engage the inner edges of the side plates.

4. An armor for a pneumatic tire comprising annular side plates, radially movable tread blocks between the side plates, cushion treads secured in the outer ends of the tread blocks, means to secure the side plates together and a supporting rim.

5. An armor for a pneumatic tire comprising annular side plates channeled interiorly to engage the fabricated shoe, radially movable tread blocks between the side plates and means to secure the side plates together.

6. An armored pneumatic tire comprising annular side plates channeled interiorly, a fabricated shoe engaging the channels of the side plates, radially movable tread blocks between the side plates and means to secure the side plates together.

7. An armored pneumatic tire comprising annular side plates channeled interiorly, a fabricated shoe engaging the channels of the side plates, radially movable tread blocks between the side plates, spacing bolts to secure the side plates together near their outer edges and a flanged supporting rim to engage the inner edges of the side plates.

8. An armor for a pneumatic tire comprising annular side plates having inner shoulders, radially movable tread blocks between the side plates headed at their inner ends, and sound deadening devices interposed between the heads of the tread blocks and the shoulders of the side plates.

9. An armor for a pneumatic tire comprising annular side plates, shouldered interiorly, radially movable tread blocks between the side plates, said tread blocks being flanged at their inner and outer ends, and means to secure the side plates together.

This specification signed this 24th day of September, A. D. 1918.

FRANK SCHNEIBLE.

Copies of this patent may be obtained for five cents each, by addressing the "Commissioner of Patents, Washington, D. C."